United States Patent
Engel et al.

[11] 3,942,878
[45] Mar. 9, 1976

[54] APPARATUS FOR MODULATING A HIGH ENERGY BEAM

[75] Inventors: Simon L. Engel, Mountain View, Calif.; Robert A. McFall, East Peoria, Ill.

[73] Assignee: Caterpillar Tractor Co., Peoria, Ill.

[22] Filed: Aug. 5, 1974

[21] Appl. No.: 494,753

[52] U.S. Cl. .................. 350/274; 219/121 L
[51] Int. Cl.² ........................... G05D 25/00
[58] Field of Search .............. 350/266, 273–275; 250/233; 219/121 L, 121 LM

[56] References Cited
UNITED STATES PATENTS

| | | | |
|---|---|---|---|
| 3,603,665 | 9/1971 | Goldmark | 350/274 X |
| 3,619,037 | 11/1971 | Pugh | 350/275 X |
| 3,750,049 | 7/1973 | Dowley | 350/275 X |

*Primary Examiner*—Alfred E. Smith
*Assistant Examiner*—F. L. Evans
*Attorney, Agent, or Firm*—Phillips, Moore, Weissenberger Lempio & Strabala

[57] ABSTRACT

An apparatus for modulating a high energy beam such as a laser beam comprising a rotor having a plurality of circumferentially spaced selectively shaped openings formed in a periphery thereof and adapted to rotate in the path of said high energy beam for permitting modulated portions of said beam to pass through to a work piece. Impeller blades are integrally formed on the rotor to provide a supply of cooling air that is pumped axially inward and directed radially outward through a space between the rotor and end shroud positioned thereover. The shroud contains a plurality of vanes formed to direct the cooling air against the peripheral portion of the rotor exposed to the laser beam to effect cooling thereof. The periphery is also provided with a reflective surface adapted to reflect the impinging portions of the beam to a beam trap to reduce the heating effect of the beam on the rotor.

12 Claims, 6 Drawing Figures

U.S. Patent  March 9, 1976  Sheet 1 of 2  3,942,878
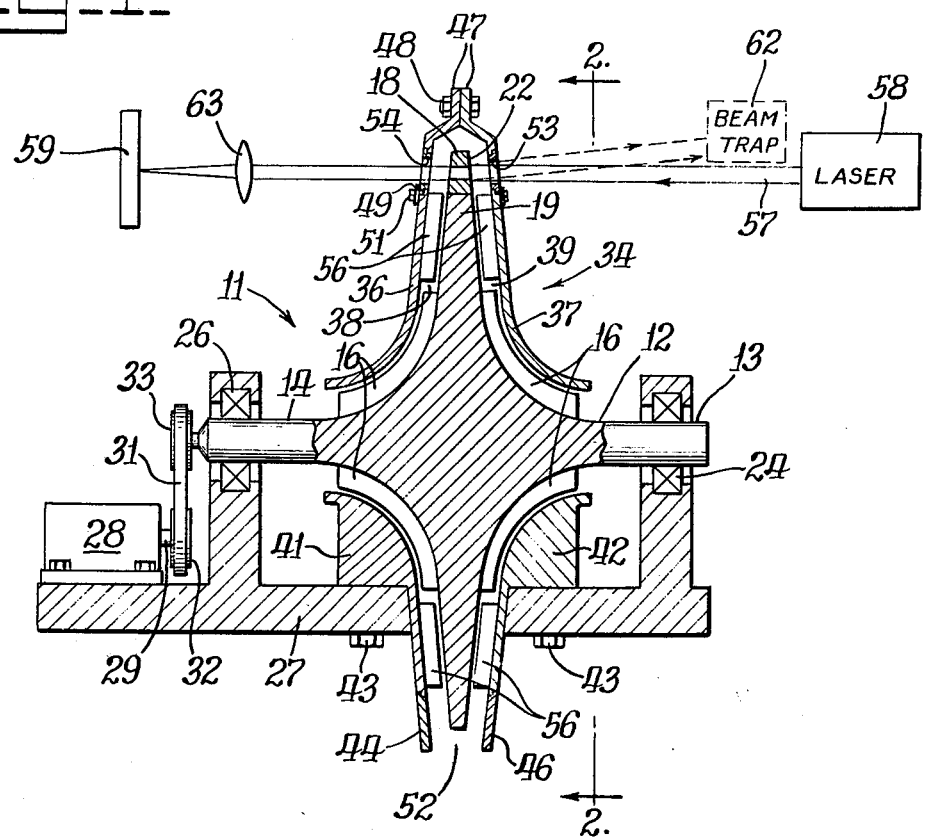
Fig-1-
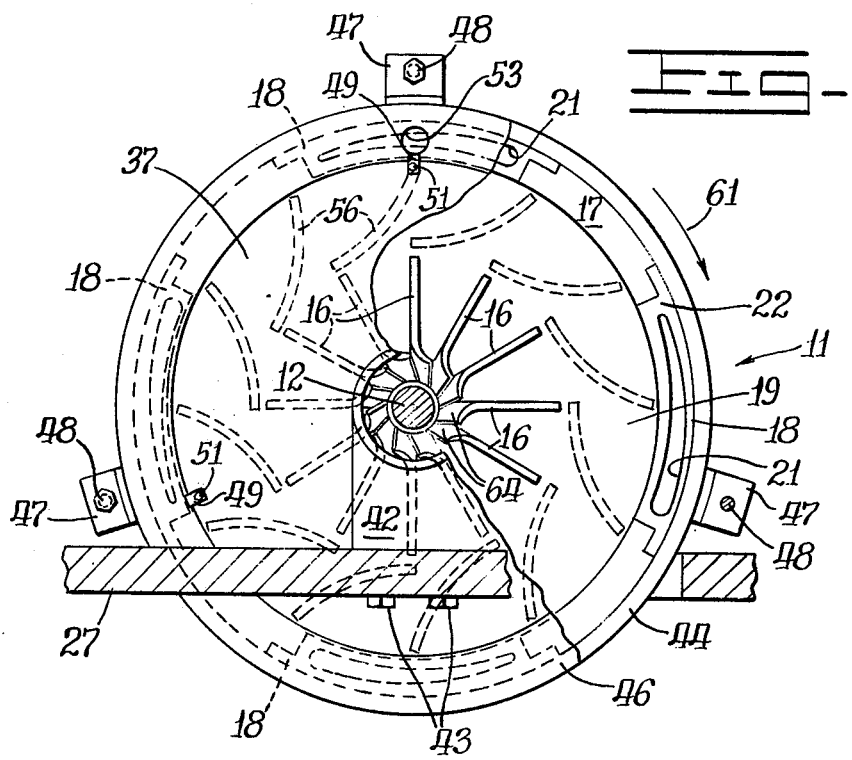
Fig-2-

APPARATUS FOR MODULATING A HIGH ENERGY BEAM

BACKGROUND OF THE INVENTION

The development of high energy beams such as the continuous carbon dioxide laser beam has provided a valuable industrial tool with potential in many metal working applications. The ability of this beam to cut, drill and weld a wide variety of materials and metals is well known. However, different applications result in different types of beams being desirable.

For example, certain applications are best carried out with the continuous beam of electromagnetic energy from the laser, while in other applications a pulsed or non-continuous beam is preferred. For example, in gas assisted cutting operations, a continuous beam is generally desirable. However, in certain drilling and welding operations where vaporized metal and other gaseous products of the operation tend to prevent continuous transmission of the beam to the work surface, it is advantageous to perform the work in increments, while alternately removing or blowing away any deleterious gaseous materials which may interfere with the beam. It is the pulsed or non-continuous beam to which the present invention is directed.

It is well known to provide methods of pulsing continuous laser beams, and such methods include the use of rotating mirrors, electromagnetic Q-switching, pump energy modulation and mechanical modulation. Generally, pulse methods involving Q-switching or internal, electrical or electromechanical modifications to the laser or laser supply may compromise the efficiency and power output of the laser in the continuous operating mode, as well as increase the complexity of the circuitry and consequent cost thereof.

Mechanical methods such as slotted rotating disks have been used to physically interrupt a continuous beam from the laser and thereby provide a pulsed beam to a work surface. For example, mechanical beam interruption is shown in British Pat. No. 1,342,436 published Jan. 3, 1974. Since such mechanical elements are exposed to the laser beam, the amount of heat absorbed by the disk for a given power density is a function of the surface reflectivity and cooling. Consequently, such mechanical beam modulators have heretofore been restricted to generally low power lasers. In other words, cooling has been a rather serious problem, and has rendered such mechanical beam modulators unsatisfactory for use with high energy beams.

SUMMARY OF THE INVENTION

The present invention relates to an apparatus for modulating a high energy beam, and more particularly to an apparatus for mechanically modulating such a beam which is provided with efficient cooling means.

It is therefore a primary object of the present invention to provide a self-cooled, mechanical modulator which is capable of modulating high energy beams without compromising the normal continuous operating characteristics of the beam.

Another object of the invention is to provide a self-cooled, mechanical modulator which is constructed of a minimum of parts, and which is absolutely reliable in operation.

These and other objects of the invention are achieved by an apparatus for modulating a high energy beam such as a laser beam comprising a rotor driven by a suitable motor and positioned to intercept the beam at the periphery thereof, said rotor having at least one shaped opening at its periphery positioned to allow passage of the beam therethrough as said opening moves into the path of the beam during rotation of the rotor, and means carried on the rotor to direct cooling air over the peripheral rotor surfaces.

The peripheral portion of the rotor is provided with a reflective surface positioned to reflect the beam impinging thereon to a suitable beam trap, and the opening is shaped to pass all or part of the beam therethrough in accordance with the predetermined program, so that the beam is both chopped and modulated. An important feature of the invention resides in the provision of cooling means within the rotor which are very efficient and self operating upon rotation of the rotor. Such efficient cooling means are adequate to provide sufficient cooling, such that high powered beams may be handled without the temperature of the rotor becoming high enough to damage the reflective surface.

In accordance with the preferred form of the invention, the rotor is provided with a shroud positioned thereover to enclose a chamber having inlet openings near the axle of the rotor and outlet openings at the periphery of the rotor. The rotor is then provided with impeller blades which act in a manner similar to a centrifugal pump to bring air in near the axle opening and throw the air outwardly through the peripheral openings. Improvements are also obtained by providing deflecting vanes on the shroud whereby high velocity air strikes the critical surfaces to be cooled.

Another feature of the invention resides in providing the shaped opening on replaceable inserts. This feature allows different inserts to be utilized on the apparatus in order to provide different modulating or shaping of the beam as desired for actual use of the apparatus. In addition, the replaceability allows for easy replacement in the event that the reflective surfaces near the insert should become damaged.

BRIEF DESCRIPTION OF THE DRAWING

A preferred form of the invention is illustrated in the accompanying drawing forming a part of this description, in which:

FIG. 1 is a sectional elevational view of a preferred form of the apparatus together with a diagrammatic indication of the apparatus in use;

FIG. 2 is an end elevational view partly in section as illustrated by the line 2—2 of FIG. 1, with certain of the parts being broken away to indicate internal structure;

Figure 3:
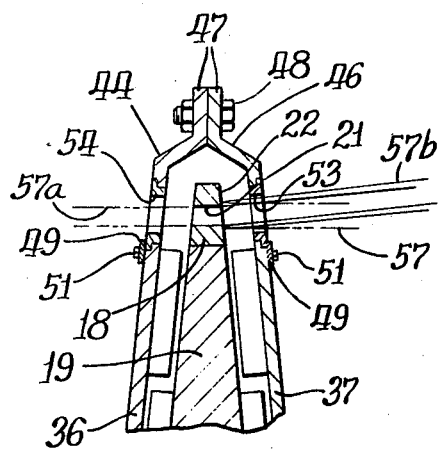
FIG. 3 is an enlarged, fragmentary, sectional view illustrating the peripheral portion of the rotor at one position.

While only the preferred form of the invention is shown, it should be understood that various changes or modifications may be made within the scope of the claims attached hereto without departing from the spirit of the invention.

Detailed Description of the Preferred Embodiment

Referring more particularly to FIGS. 1 and 2, an apparatus in the form of a mechanical modulator 11 is shown for chopping and modulating a high energy, continuous, laser beam. The modulator comprises a rotor 12 being of somewhat disk-shaped configuration with the central portion thereof extended to form journalled portions 13 and 14 along a central axis. A plurality of generally radially disposed blades 16 are integrally formed on each side of the disk-like rotor at the central portion thereof.

The outer section of the disk portion is tapered toward the radially outward position to provide a substantially reduced section thickness at the circumference of the disk. In addition, a portion of the disk-like outer section 19 of the rotor at the periphery thereof adjacent the outer perimeter is plated or otherwise treated to provide a reflective surface 17.

Figure 5:
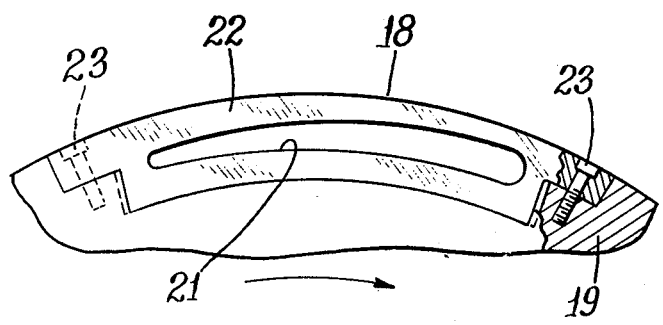
FIG. 5 is an enlarged fragmentary view of the rotor periphery as seen from an end view.

As shown in greater detail in FIG. 5, a plurality of interchangeable inserts 18 are equidistantly spaced about the perimeter of the disk-like outer section 19 of rotor 12. As here shown, four inserts are provided, but it will be appreciated that any number could be used, if desired. The inserts are formed with a shaped opening 21 for allowing the laser beam to pass therethrough, and has a reflective surface 22 provided on one side thereof to reflect that part of the beam that does not pass through the opening. As illustrated in FIG. 5, the inserts 18 are fastened to the outer section 19 of rotor 12 through cap screws 23, which screws are easily removed to facilitate interchangeability.

The rotor 12 is rotatably mounted at the journal ends 13 and 14 by bearings 24 and 26, respectively, which are supported by a frame 27. A variable speed electric drive motor 28 having an output shaft 29 is also mounted to the frame 27. The motor rotationally drives the rotor 12 through a belt 31 connecting a pulley 32 carried on the motor output shaft 29 with a pulley 33 attached to the journal end 14 of the rotor.

A shroud 34 substantially encloses the rotor disk portion 19 by means of housings 36 and 37, which are carried in close proximity to the rotor disk to define annular fluid passages 38 and 39 therebetween. The housings 36 and 37 have mounting pads 41 and 42, respectively, provided thereon for mounting the housings to the frame 27. Each of the housings are secured in place by bolts 43 to secure a central portion and to maintain the fluid passages in the desired configuration. A pair of rotatably adjustable rings 44 and 46 are circumferentially mounted about the housings 36 and 37. Each of the rings has a plurality of generally radially extending tabs 47 providing attachment points for securing the rings together by bolts 48. The rings 44 and 46 are position fixed with respect to the housings 36 and 37 by clamps 49 and cap screws 51. In this way, the housings are positively fixed with respect to the rotor so as to accurately define the internal passages.

In addition to providing a substantially obstruction free circumferential discharge opening 52 for passages 38 and 39, the rings 44 and 46 also have circular beam ports 53 and 54 formed therein. In order to provide an improved air flow through the passages 38 and 39, a plurality of generally radially extending vanes 56 are integrally formed on each of the housings to directionally control the flow of fluid through the passages and channel the fluid for the optimum cooling effect.

Figure 4:
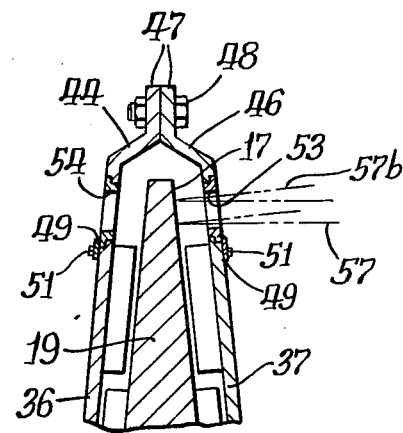
FIG. 4 is a view similar to FIG. 3 but illustrating the rotor at another rotational position.

In operation, the apparatus 11 is used to interrupt and modulate a high energy beam. Thus, as shown in FIG. 1, a continuous collimated beam 57 is supplied by laser 58, and directed toward a work piece 59. The apparatus is positioned with respect to the laser beam 57, so that the beam will be aligned with the beam ports 53 and 54 thereof, and with shaped openings 21 moving through the beam path as the rotor is turned. Accordingly, when the rotor 12 is rotated by the variable speed electric motor 28 at a preselected rate in the direction indicated by arrow 61 of FIG. 2, the shaped opening moves through the path of the beam 57 after it enters beam port 53 (note FIG. 2). As shown in FIG. 3, with the shaped opening in alignment with beam 57, part of the beam 57a is passed through the apparatus, and another part of the beam 57b is reflected to beam trap 62. When the shaped openings are not in alignment with beam 57, the entire beam is reflected as shown in FIG. 4, with the reflected beam 57b again going to beam trap 62.

Thus it is seen that the apparatus chops or provides beam pulses at regular intervals. In addition, it is noted that a controlled amount of beam passes through the device depending upon the shape of the opening 21 and the amount of beam which is passed therethrough. Accordingly, the apparatus also modulates the laser beam 57a. The modulated beam 57a is then passed to an optical conditioning system schematically represented by a lens element 63 from which it is directed or focussed to the work piece 59.

Figure 6:
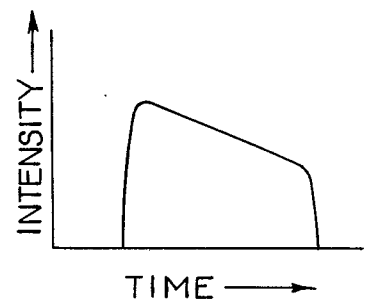
FIG. 6 is a diagram illustrating modulation of the high energy beam in graph form.

The power intensity of the beam 57a is controlled by regulating the portion of the beam 57 permitted to pass through the disk section 19. This regulation is obtained by the shape of the openings 21 formed in the interchangeable inserts 18. In the apparatus here shown, when rotated in the direction of arrow 61, the beam goes through a period of zero passage, and suddenly to an initially great amount of passage, which gradually decreases as the disk continues its rotation, until there is a sudden dropping to the zero point again. This controlled or modulated pulse is graphically illustrated in the diagram of FIG. 6. If desired, the intensity characteristics of the pulse shown in FIG. 6 may be reversed, by simply reversing the interchangeable insert 18. Likewise, different pulse intensity characteristics may be formed by providing different inserts having a desired shaped opening. In this way, the proportional amount of the laser beam which is pulsed and the intensity of the pulse may be programmed as desired without the need for providing separate disks.

The form of apparatus shown in FIG. 2, provides an illustrative example of a typical modulated pulse. Thus, as illustrated in FIG. 2, the length of the shaped openings 21 is approximately ⅛ of the total circumferential difference. The rate at which portions of the beam are passed to the work piece is determined by the velocity of the rotor 12. Therefore, the velocity of the rotor and the pulse rate of the beam 57a is controlled by regulation of the variable speed motor 28. For example, if the rotor is driven at a rate of 3000 rpm, the modulated beam 57a would have a pulse rate of 200 pulses per second, with each pulse having a time duration of 2.56 milliseconds.

The apparatus is sized so as to handle the beam size to be pulsed and modulated. In the example herein given, the slots 21 are positioned at a distance of 6 inches from the center of the rotor, making the circumference of the circle defined by the slot movement approximately 37.68 inches, with each slot being approximately 4.71 inches in length. With such a rotor size, it will be appreciated that variation in laser beam sources can also be accommodated by utilizing different inserts as well as providing differences in pulse rate and modulation for a given diameter beam size.

The tapered configuration of the disk portion 19 provides a skewed surface for directing the reflected beam 57b to the beam trap 62. As best illustrated in FIGS. 3 and 4, the reflective surface 17 on the disk portion, and likewise the reflective surface 22 on the insert serve to substantially reflect those portions of the beam 57 not passed through the shaped opening 21.

With careful selection of plating or coating materials, and attention given to providing an adequate surface finish, the reflective surfaces 17 and 22 will reflect substantially all of the beam directed thereagainst. For example, a properly prepared coating of copper will reflect approximately 98% of the laser beam having a wave length of 10.6 microns, which is a typical beam now in use and supplied by a carbon dioxide laser.

At low power levels, the amount of energy absorbed as heat will not adversely affect the performance of the reflective surfaces. In such a case, even in static state operation, the temperature of the disk will stabilize at a temperature somewhat above that of the surrounding medium. However, at the higher power levels provided by lasers now available, the disk thermal equilibrium temperature tends to exceed the temperature sufficient to cause deterioration of the reflective surfaces. In other words, the higher powered lasers require cooling. In addition, the amount of cooling provided is important because the better the cooling, the higher the power level of operation permissible. With the apparatus of the present invention, the excellent cooling achieved permits operation at power levels of 10 kilowatts to 50 kilowatts or even higher.

The cooling effect is achieved by blowing air across the heated surfaces. Thus, the blades 16 provided on the disk portion 18 serve to draw cool ambient air into passages 38 and 39 and expell the air outwardly at a high velocity, much as in the operation of a centrifugal pump. Thus, the cool air is drawn in toward the central portion by virtue of the vacuum created from the centrifugally moving air. In addition, the blades are formed with curved ends 64, as best seen in FIG. 2, which provide a velocity component to assist the movement of incoming air.

The air discharged by the blades will have both radial and tangential velocity components, and the vanes 56 serve to turn the air radially, thus increasing the radial velocity component and thereby increasing the relative velocity of the air moving across the disk surface to be cooled. In other words, the vanes direct the cooling air flow radially across the reflective surfaces 17 and 22 and subsequently discharge the air radially through opening 52.

The blade and vane arrangement as described herein thus cooperate to provide a continuous flow of cooling air for increased transfer of heat away from the disk. In addition, the high velocity of the cooling air directed over the surface to be cooled improves the heat transfer characteristics between the cooling fluid and the solid medium being cooled.

From the foregoing description, it is seen that an apparatus is provided which is capable of chopping and modulating laser beams into any pulse configuration that may be desirable. It is also seen that the apparatus provides excellent cooling means for more efficient operation to the chopping and modulating portion thereof, and provides an apparatus which is suitable for high energy beam use, such as the high powered carbon dioxide lasers now being put into use for various industrial operations.

What is claimed is:

1. Apparatus for modulating a high energy electromagnetic beam such as a laser beam comprising:
   a disk-shaped rotor positioned to intercept the beam at the periphery thereof,
   means rotating said rotor about its central axis,
   said rotor having at least one shaped opening at the periphery thereof positioned to allow passage of said beam therethrough as said opening moves into the path of said beam during rotation of said rotor,
   a pair of annular shroud members each positioned adjacent a different one of the sides of said rotor to define annular spaces adjacent the opposite sides of said rotor, and
   impeller blades carried on each side of said rotor and cooperating with said shroud members to pump cooling air radially from a central portion of said rotor over the peripheral surfaces of said rotor during rotation thereof, whereby air cooling of said peripheral surfaces of said rotor is provided in operation.

2. An apparatus for modulating a high energy beam as defined in claim 1, in which the shaped opening at the periphery of the rotor is carried in a replaceable insert.

3. An apparatus for modulating a high energy beam as defined in claim 2, in which a plurality of openings and a plurality of replaceable inserts are provided.

4. An apparatus for modulating a high energy beam as defined in claim 1, in which the peripheral surface of the rotor is provided with a reflective surface to reduce the absorption of energy obtained from the beam impinging thereon.

5. An apparatus for modulating a high energy beam as defined in claim 4 in which an absorbtion chamber is provided, and in which the reflective surface of the rotor is tapered to reflect the beam impinging thereon back to said absorbtion chamber.

6. Apparatus for modulating a high energy beam such as a laser beam comprising
   a disk-shaped rotor positioned to intercept the beam at the periphery thereof,
   means for rotating said rotor,
   mounting means for carrying said rotor and associated rotating means,
   said rotor having at least one shaped opening at the periphery thereof positioned to allow passage of the beam therethrough as said opening moves into the path of the beam during rotation of the rotor,
   a shroud mounted on said mounting means for providing an annular space between the rotor and shroud with the space being open near the axis of the rotor and near the periphery, and
   blade means on said rotor for impelling air entering said annular space near the axis outwards through the opening near the periphery whereby the rotor is cooled to remove heat energy absorbed by the rotor from the high energy beam.

7. An apparatus for modulating a high energy beam as defined in claim 6, in which vanes are provided on the shroud for directing cooling air more forcibly against the periphery of the rotor.

8. An apparatus for modulating a high energy beam as defined in claim 7, in which the periphery of the rotor is provided with a reflective surface along the area of impingement of the high energy beam.

9. An apparatus for modulating a high energy beam as defined in claim 8, in which a plurality of shaped openings are provided at the periphery at the rotor, and in which said openings are provided in a replaceable insert.

10. An apparatus for modulating a high energy laser beam as defined in claim 9, in which an absorbtion chamber is provided to absorb the high energy radiation reflected from the rotor.

11. An apparatus for modulating a high energy beam as defined in claim 6, in which the shaped opening is formed to partially reflect and to partially transmit the beam as the beam traverses the opening.

12. An apparatus for modulating a high energy beam as defined in claim 11, in which the opening is shaped so that a progressively different amount of radiation is passed through the opening as the beam sweeps thereacross.

* * * * *